United States Patent Office 3,271,755
Patented Sept. 6, 1966

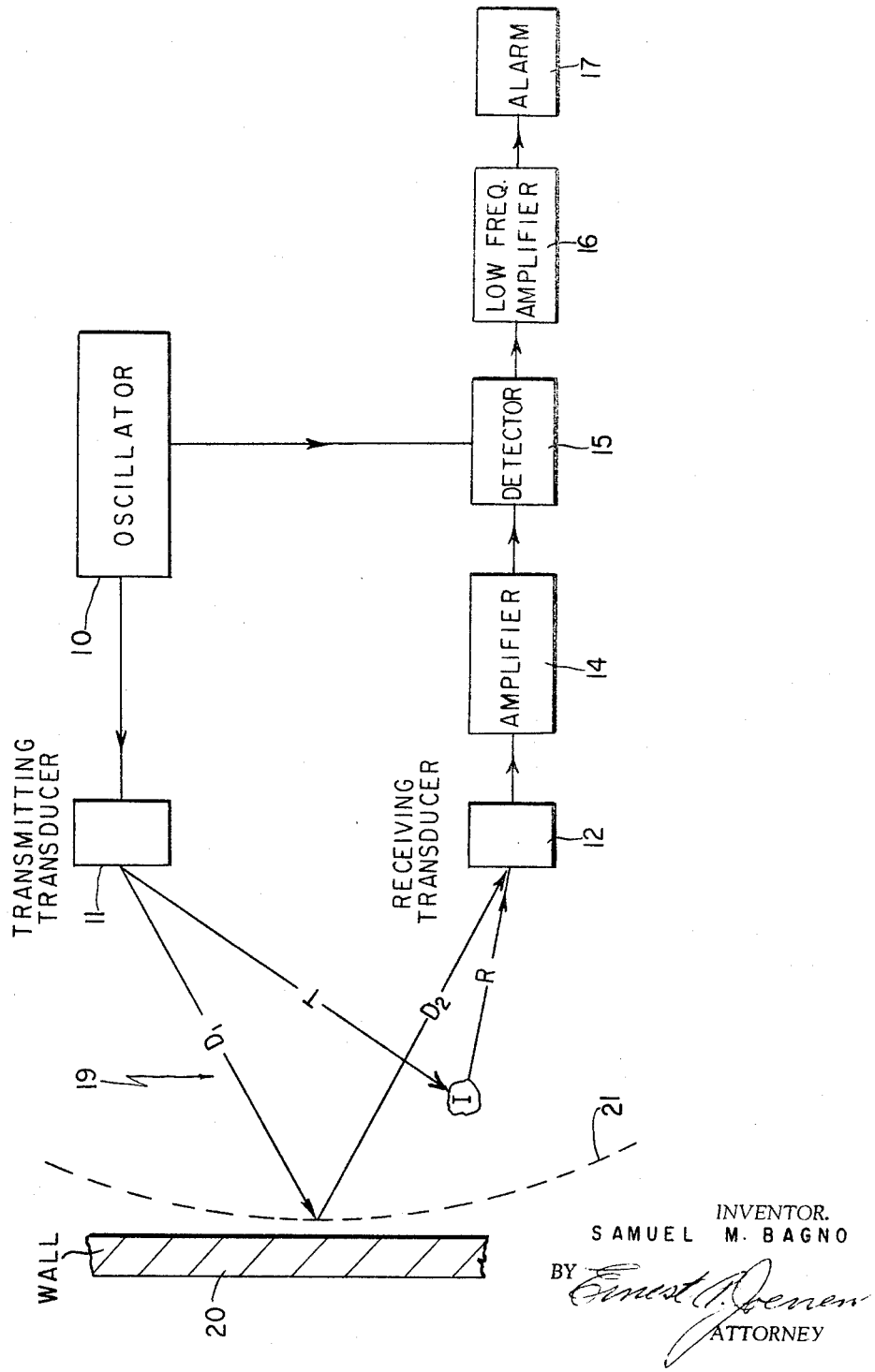

3,271,755
DOPPLER TYPE INTRUDER DETECTION SYSTEM ARRANGED TO ELIMINATE EXTRANEOUS AIR TURBULENCE EFFECTS
Samuel M. Bagno, Belleville, N.J., assignor to Specialties Development Corporation, Belleville, N.J., a corporation of New York
Filed Mar. 16, 1964, Ser. No. 352,215
1 Claim. (Cl. 340—258)

The present invention relates to ultrasonic intruder detection systems, and, more particularly, to a method of operating such a system in a manner to eliminate the effects of turbulence and other extraneous conditions.

In ultrasonic intruder detection systems, ultrasonic energy waves are radiated into an enclosed space to be protected and reflections of these waves are received and compared with the radiated waves. When an intruder moves through the space, the frequency of the reflected waves is changed due to the Doppler effect and this change in frequency is detected and an alarm is given. It was found that air turbulence also produced a frequency change in the reflected waves and therefore caused false alarms. Such systems have been operated at 19,000 cycles per second or less.

One method of successfully compensating for the effects of turbulence is described in U.S. Patent No. 2,794,974, June 4, 1957. The system described in this patent relies upon the discovery that the signals produced as a result of certain types of turbulence have properties which can be distinguished from the signals produced by moving objects. The circuitry for distinguishing these signals however adds to the complexity and cost of the system.

The change in frequency of the sound waves as a result of air turbulence is caused by the passage of sound waves through air which is in motion. When these modified waves are subsequently reflected from the walls of the enclosed area being protected or from stationary objects within the space, the received signals vary in frequency and a false alarm is given.

Accordingly, an object of the present invention is to provide an improved method of operating an ultrasonic intruder detection system.

Another object is to provide such a method which eliminates the effects of extraneous conditions such as turbulence.

A further object is to eliminate the effects of extraneous conditions in a simple, practical and economical manner.

Other and further objects of the invention will be obvious upon an understanding of the illustrative embodiment about to be described, or will be indicated in the appended claim, and various advantages not referred to herein will occur to one skilled in the art upon employment of the invention in practice.

In accordance with the present invention the foregoing objects are generally accomplished by radiating ultrasonic energy waves within the perimeter of a space of less area than the area of an enclosed space to be protected with the range of the waves being such that they will not reach the walls defining the enclosed space and thus will not be reflected, wherefore, the system functions as if it were outdoors without the reflective effects of the space enclosing walls.

It has been found that the boundary or perimeter of this imaginary space can be accurately located within an enclosed space or outdoors by radiating ultrasonic energy waves at such high frequencies which waves are attenuated to an ineffective amplitude after travelling a distance greater than the sum of a distance D1 between the transmitter and the perimeter of a distance D2 between the perimeter and the receiver.

Thus by using the formula $A = e^{-Rf^2S}$, wherein A is the minimum permissible ratio of received signal amplitude to transmitted signal amplitude to produce a detectable signal at the receiver, $e$ is the base of natural logarithms, R is a constant dependent upon the viscosity and density of the air and the velocity of sound through the air, $f$ is the frequency of the radiated ultrasonic energy waves, and S is the sum of the distances D1 and D2, the proper frequency can be determined.

A preferred embodiment of the invention has been chosen for purposes of illustration and description, and is shown in the accompanying drawing, forming a part of the specification, wherein:

The single figure of the drawing is a block diagram of an ultrasonic intruder detection system operated in accordance with the present invention.

Referring to the drawing in detail, there is shown an ultrasonic detection system which generally comprises an oscillator 10, a transmitting transducer 11, a receiving transducer 12, an amplifier 14, a detector 15, a low frequency amplifier 16, and an alarm 17.

The system is arrangement to protect an area 19 which has a wall 20 serving as one boundary thereof.

The oscillator 10 operates within the ultrasonic range and drives the transducer 11 which radiates ultrasonic waves into the area 19. If an intruder enters the area 19, the ultrasonic waves are reflected from the intruder back to the receiving transducer 12. As long as the intruder is moving, the frequency of the ultrasonic waves is modified during the reflection of waves so that the electrical signal produced by the receiving transducer 12 has a different frequency than the output of the oscillator 10. The signal so produced by the receiving transducer 12 is amplified by the amplifier 14 and fed into the detector 15. The detector 15 beats the received signal against the oscillator output and produces an output having a frequency equal to the difference in frequency between the transmitted and received signals. This low frequency signal is amplified by the amplifier 16 and operates the alarm 17 to indicate the presence of an intruder.

As shown in the drawing, the system is installed within the enclosure 19 with the transmitter 11 and the receiver 12 spaced from the wall 20, and the operating frequency of the oscillator 10 is adjusted to a value so that the maximum effective range of the system is within the perimeter 21 depicted by the arc in broken lines. In such an arrangement, the radiated waves come close to the wall but do not reach the wall because they have been attenuated, whereby they are not reflected.

As a specific example of practicing the present invention, the operating frequency should substantially exceed 19,000 c.p.s. and preferably should be in the vicinity of 40,000 c.p.s. or above. The transmitter 11 and the receiver 12 are located at points spaced about equally from the perimeter 21 so that in this example the sum S of D1 plus D2 is equal to 60 feet, whereby the oscillator 10 is set at 40,000 c.p.s. to confine the effective range of reflection within the space bounded by the perimeter 21.

When an intruder I is within the perimeter 21, transmitted waves T are stopped by the intruder to produce reflected waves R which are received by the receiver 12, whereby any motion of the intruder within the perimeter produces the Doppler effect which is detected by the system to give an alarm.

This system would function similarly within the perimeter 21 if installed outdoors, and could easily be arranged so that large reflective objects do not fall within the perimeter.

From the foregoing description, it will be seen that the present invention provides an intruder detection system which overcomes the disadvantages of prior systems.

As various changes may be made in the form, construction and arrangement of the parts herein, without depart-

I claim:

Apparatus insensitive to air turbulence for detecting the motion of an intruder within an inner portion of an area at least partially bounded by reflective objects, said inner portion being defined by a predetermined perimeter lying inwardly of said reflective objects, said apparatus including means for producing ultrasonic energy at a given high frequency of at least about 40,000 cycles per second, transducer means for radiating the ultrasonic energy from a point within said inner portion of said area, transducer means for receiving only reflected ultrasonic energy at a point within said inner portion of said area, said receiving transducer means being positioned with respect to said radiating transducer means to prevent a direct line of transmission of ultrasonic energy through air from said radiating transducer means to said receiving transducer means, means for comparing the frequency of the radiated and reflected energy and for detecting any difference in frequency between the radiated energy and reflected energy having an amplitude at least equal to a predetermined percentage of the amplitude of the radiated energy, said radiating and receiving transducers being located with respect to any point of said perimeter at fixed distances determined by the frequency of the radiated energy according to the relationship $A = e^{-Rf^2S}$ so that radiated energy reflected from a point beyond said perimeter is attenuated by the air to an amplitude less than said predetermined percentage of the radiated energy amplitude, in said relationship A being the minimum permissible ratio of received energy amplitude to radiated energy amplitude to produce a detectable signal at said receiving transducer, $e$ being the base of natural logarithms, R being a constant dependent upon the viscosity and density of the air and the velocity of sound through the air, $f$ being the frequency of the radiated energy, and S being the sum of the distances from any point on said perimeter to said transducers, whereby said apparatus is insensitive to radiated energy which is changed in frequency by passage through moving air within said perimeter and is reflected from a point beyond said perimeter.

References Cited by the Examiner

UNITED STATES PATENTS

| | | | |
|---|---|---|---|
| 1,471,547 | 10/1923 | Chilowsky | 340—3 |
| 2,442,695 | 6/1948 | Koch. | |
| 2,629,865 | 2/1953 | Barker. | |
| 2,655,645 | 10/1953 | Bagno | 340—258 |
| 2,832,544 | 1/1956 | Bagno | 340—258 X |
| 2,965,893 | 12/1960 | Barker. | |
| 3,161,876 | 12/1964 | Barker. | |

OTHER REFERENCES

Publication: Bagno, "Designing Ultrasonic Alarm Systems," Electronics, August 1955.

Hardy, Proceedings of the National Electronics Conference, vol. 11, 1955.

Buckley, vice president, Kidde Co., "Intrusion Protection," Electronics Technician, vol. 80, No. 1, July 1964.

NEIL C. READ, *Primary Examiner.*

R. M. GOLDMAN, *Assistant Examiner.*